US009186809B2

(12) United States Patent
Angelo et al.

(10) Patent No.: US 9,186,809 B2
(45) Date of Patent: Nov. 17, 2015

(54) ANTI-KICK RIP FENCE SAFETY GUIDE

(75) Inventors: Don L. Angelo, Phillips, WI (US); Ron E. Angelo, Phillips, WI (US)

(73) Assignee: Total Saw Solutions, Inc., Phillips, WI (US)

( * ) Notice: Subject to any disclaimer, the term of this patent is extended or adjusted under 35 U.S.C. 154(b) by 478 days.

(21) Appl. No.: 13/338,606

(22) Filed: Dec. 28, 2011

(65) Prior Publication Data

US 2013/0167702 A1 Jul. 4, 2013

(51) Int. Cl.

*B27B 27/02* (2006.01)
*B27B 27/08* (2006.01)
*B23D 47/02* (2006.01)
*B26D 7/22* (2006.01)
*B27C 5/04* (2006.01)

(52) U.S. Cl.

CPC ................. *B27B 27/02* (2013.01); *B27B 27/08* (2013.01); *B27C 5/04* (2013.01); *B26D 7/22* (2013.01); *Y10T 83/727* (2015.04); *Y10T 83/732* (2015.04); *Y10T 83/773* (2015.04)

(58) Field of Classification Search

CPC ........ B27B 27/02; B27B 27/08; B27B 27/10; B23D 47/02; B23D 47/025; B27C 5/04; B26D 7/22; Y10T 83/727; Y10T 83/732; Y10T 83/735; Y10T 83/773
USPC ........................... 83/438, 440.2, 477.2, 441.1
IPC ........................................................ B27B 27/02
See application file for complete search history.

(56) References Cited

U.S. PATENT DOCUMENTS

| | | | | |
|---|---|---|---|---|
| 129,952 | A * | 7/1872 | Haseltine, Jr. | 83/438 |
| 363,016 | A * | 5/1887 | Stalter | 83/446 |
| 2,726,692 | A * | 12/1955 | Colignon | 144/253.1 |
| 4,201,254 | A * | 5/1980 | Fehric | 144/1.1 |
| 4,399,728 | A * | 8/1983 | Davis | 83/418 |
| 2002/0108480 | A1* | 8/2002 | Hewitt et al. | 83/446 |
| 2004/0231483 | A1* | 11/2004 | Hewitt et al. | 83/446 |
| 2008/0092707 | A1* | 4/2008 | Aigner | 83/441 |
| 2008/0127794 | A1* | 6/2008 | Jaksha | 83/409 |

* cited by examiner

*Primary Examiner* — Clark F Dexter

(74) *Attorney, Agent, or Firm* — Joseph S. Heino; Patrick M. Bergin

(57) ABSTRACT

An anti-kickback rip fence for use with a worktable of a cutting machine, such as table saw. Also discloses is an anti-kick rip fence guide for attachment to a rip fence. Both the anti-kick rip fence and the anti-kick rip fence guide provide a removeable rip guide that provides additional space between the rip fence and the saw blade, there by reducing the kick-back incidents.

4 Claims, 5 Drawing Sheets

ANTI-KICK RIP FENCE SAFETY GUIDE

FIELD OF THE INVENTION

The present invention relates generally to a rip fence used with a work table of a cutting machine, such as table saw. More specifically, the claimed invention relates to an anti-kickback rip fence guide.

BACKGROUND OF THE INVENTION

Table saws have a rotating saw blade extending through their upper surface for cutting work pieces positioned on the upper surface of the table saw. Typically, table saws are used for cross cutting, or cutting transverse to the length of the work piece, bevel cutting, which refers to cutting at an angle to the length of the work piece, and rip cutting, which refers to longitudinal cutting along the length of the work piece. For cross cutting and bevel cutting, an angularly and laterally adjustable fixture or fence is used, whereas for rip cutting, a separate rip fence must be used to hold the work piece in the desired position for the longitudinal or rip cutting that is to be performed.

The claimed invention is directed to a new and improved anti-kick rip fence for table saws and to an anti-kick rip fence safety guide for attachment to the rip fence of existing saws. Prior art rip fences work well to provide a linear guide fence along which a work piece is slideable relative to the rotatable saw blade to cut the work piece. Unfortunately, prior art rip fences can cause dangerous work piece kickback incidents.

Table saw blades rotate at high speed into the direction of the cut. The circular steel saw plate, which gives the blade its size and shape as well as fixing it to the motor arbor, is also the surface onto which the cutting teeth are attached. The "kerf" of a blade is the amount of material it removes from the stock, or, in other words, the width of the cutting teeth (and therefore, the cut). The saw plate thickness is less than that of the teeth, which provides relief between the stock and the blade.

No matter what profile the blade teeth have, the kerf will be wider than the saw plate. This allows the plate to run free within the kerf already cut into the stock as it is passed through the blade. If the saw plate were as wide as the cutting teeth, then the whole face of the saw plate would be in friction contact with the sides of the cut.

Once the stock has passed the "center" of the saw blade and therefore the center of rotation of the saw blade, the "back" of the blade has the tendency to lift the work piece upwards as soon as it overcomes the weight of work piece and any downward force applied to it. Once the weight of the work piece has been overcome, the friction of the blade upon the stock gains enough grip on the side of the work piece to propel the work piece in the direction of travel of the blade, which is unfortunately towards the operator.

As indicated above, saw plates are not as wide as their cutting teeth. Therefore, in a perfect setup wherein the rip fence is perfectly aligned with the saw blade, the saw will run freely within the width of the kerf of the cut and the work piece will never kick back. Unfortunately, it can be difficult to place the rip fence perfectly relative to the saw. For example, if the rip fence is skewed towards the saw, the work piece will become pinched between the saw and the rip fence and greatly increase the chance of a kickback incident.

Riving knives can also reduce the chances of a kickback incident. The purpose of the riving knife is to prevent sideways pressure on the blade from stock which is passing through. In order to work properly, the riving knife must be no thicker than the blade kerf and be adjusted to be in line with the blade. If not adjusted properly, the riving knife can actually cause further binding which can also lead to a kickback incident.

Therefore, what is needed is a simple and inexpensive rip fence or an attachment to a rip fence that is designed to reduce binding between the rip fence and the saw blade.

SUMMARY OF THE INVENTION

The claimed invention provides an anti-kick rip fence designed to reduce binding between the rip fence and the saw blade. The claimed invention also provides an anti-kick rip fence attachment guide designed to reduce binding between the rip fence attachment guide and the saw blade. With that in mind, the claimed invention comprises at least a first portion that provides a straight edge that can be aligned with the saw blade and a second removeable portion used for rip cutting that provides additional clearance to prevent the work piece from binding between the saw blade and the rip fence.

More specifically, the claimed invention provides a first portion for attachment to a rip fence operable to provide a straight edge for rip cutting and a removable second portion, wherein a line projecting from the center of the saw blade serves to divide the first portion and the second portion.

DETAILED DESCRIPTION OF THE INVENTION

Figure 5:
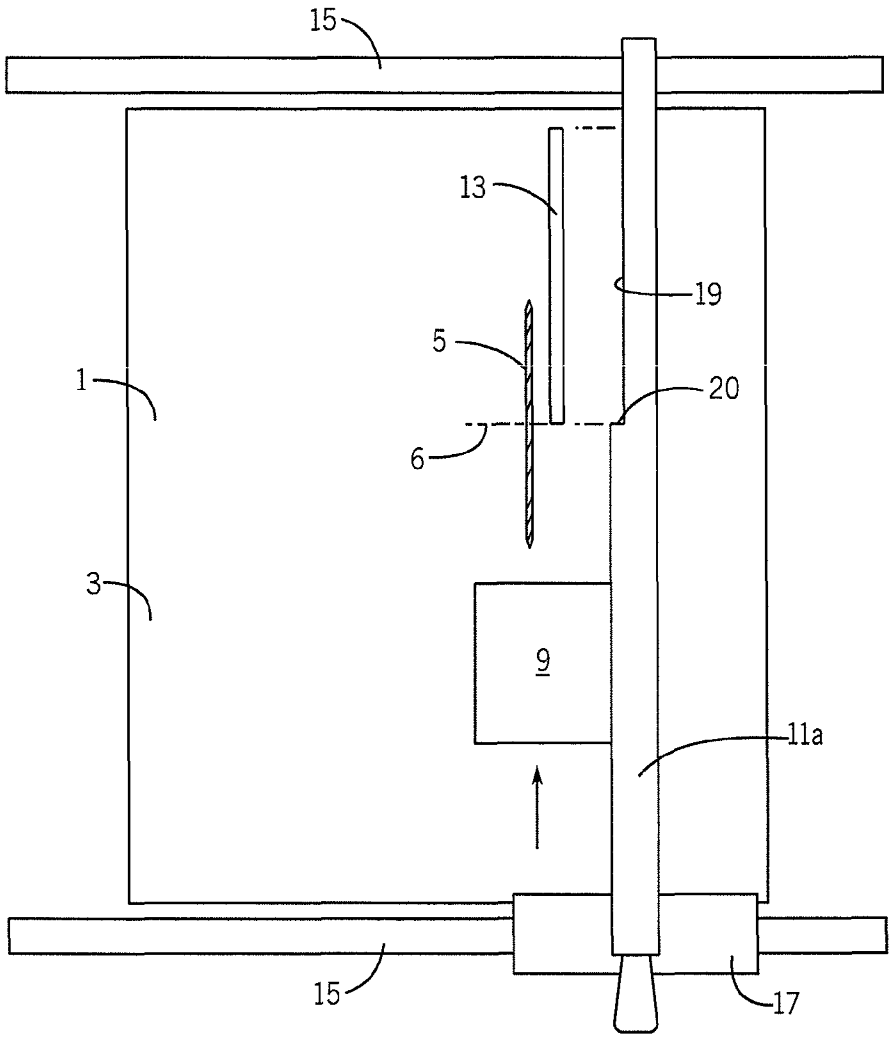
FIG. 5 is a top plan view of a rip fence that includes a removable rip guide panel.

Now referring to the drawings in detail wherein like numbers refer to like elements throughout, FIG. 5 shows the simplest embodiment of the claimed invention. More specifically, FIG. 5 shows a top plan view of a table saw 1 comprising a table surface 3, a saw blade 5 that protrudes through the table surface 3 that is used to cut or rip a work piece 9, and rip fence 11*a*. The rip fence 11*a* generally comprises a longitudinally extending body that is normally slidable along the table surface 3 on rail 15 to accommodate work pieces 9 of different widths. When the rip fence 11*a* is properly positioned so that the work piece 9 to be cut is aligned with the saw blade 5, the rip fence 11*a* is fixed to the rail via clamp 17 or some other similar means.

As discussed in above, table saws 1 are commonly used for both rip cuts and dado cuts. A rip cut is a through cut along the longitudinal axis of the work piece 9. A dado cut employs a dado blade to cut a trench in the work piece 9. When making a dado cut, it is critical to maintain the alignment the alignment of the work piece 9 relative to the entire length of the rip fence 11*a*.

Figure 3:
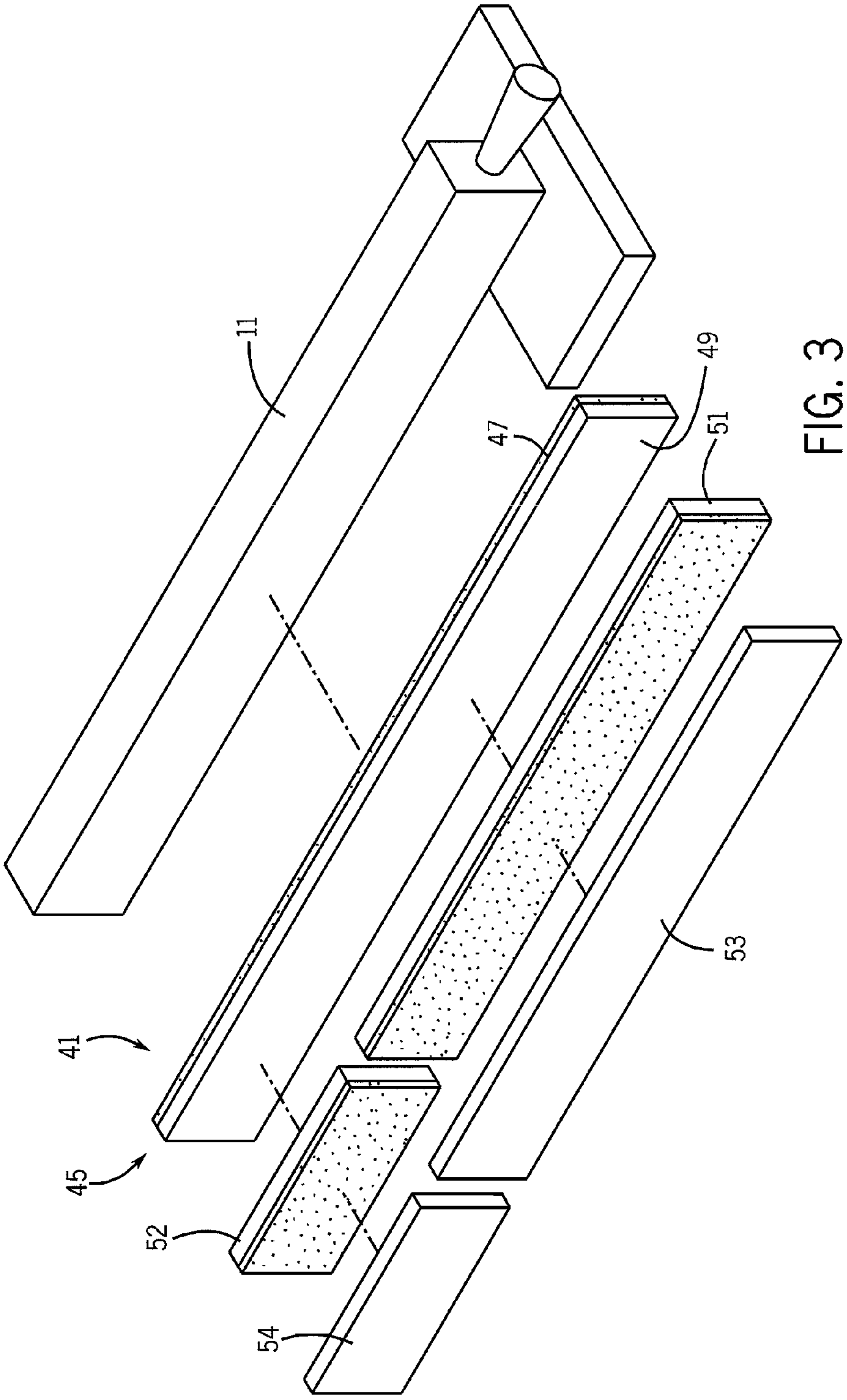
FIG. 3 is an exploded view of the rip fence guide show in FIG. 1.

For rip cutting, it is critical to maintain the alignment of the work piece 9 with the rip fence 11*a* until the work piece 9 crosses the centerline 6 of the saw blade 5. At that point, it would be advantageous to permit additional space between the saw blade 5 and the rip fence 11*a* so as to prevent the work piece 9 from binding between the saw blade 5 and the rip fence 11*a*. Therefore, for rip cuts, the claimed invention provides a removeable rip guide 13. Upon removal of the removable rip guide 13 as shown in FIG. 3, a recess 19 is created in the rip fence 11*a* thereby providing additional space between the saw blade 3 and the rip fence 11*a* to prevent binding and potential kickback situations. Preferably, the beginning 20 of the recess 19 is aligned with the centerline 6 of the saw blade 3, although anywhere within the diameter of the saw blade 3 will work.

Figure 4:
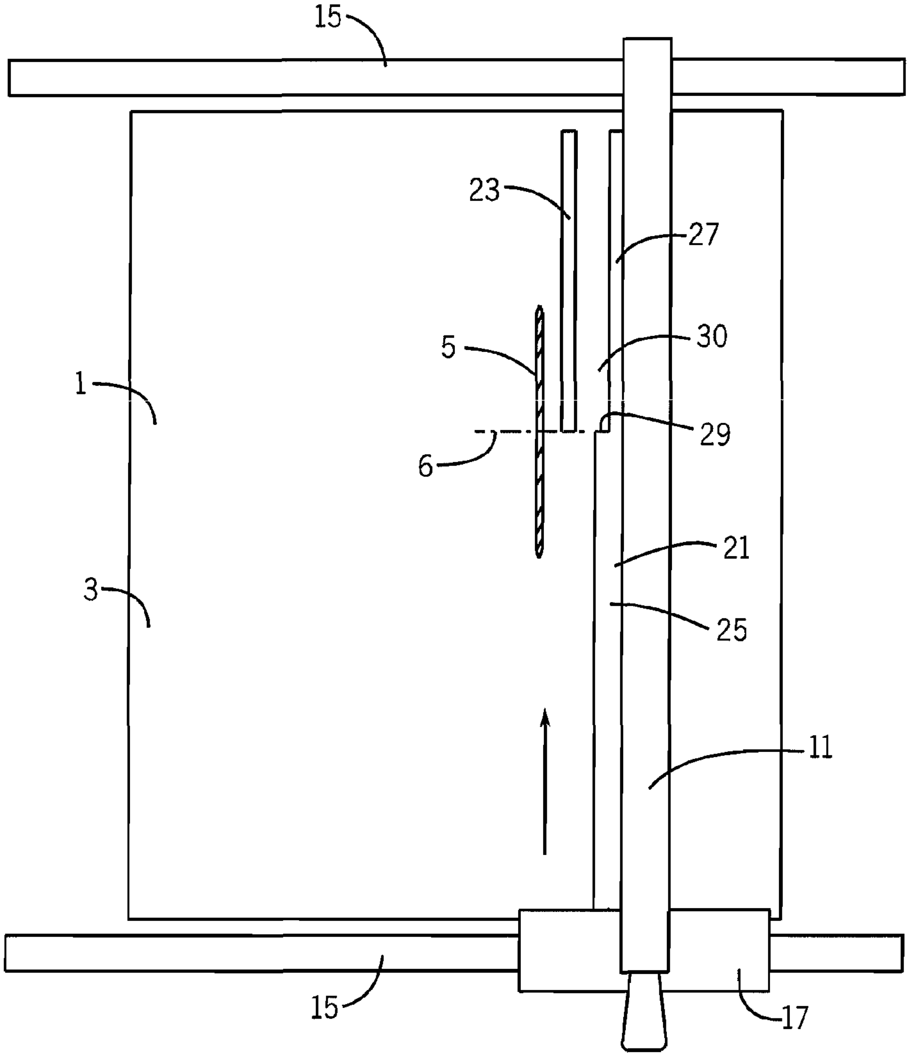
FIG. 4 is a top plan view of a standard table saw having a rip fence guide with a removable rip guide panel.

FIG. 4 shows an additional embodiment of the claimed invention wherein the anti-kick rip fence guide 21 is installed to an existing rip fence 11. In this embodiment, the anti-kick rip fence guide 21 is secured to the existing rip fence 11 using an adhesive, although other known securing methods may be used. The anti-kick rip fence guide 21 comprises a first guide portion 25 and a second magnetic guide portion 27. Between the first guide portion 25 and the second magnetic guide portion 27 is a step 29 that preferably aligns with the centerline 6 of the saw blade 5. As discussed for making dado cuts, the removable rip guide 23 is installed along the second magnetic guide portion 27 so as to provide a smooth rip fence guide 21. For rip cutting, the removable rip guide 23 is removed leaving a recess 30 in the rip fence guide 21 that provides additional space between the saw blade 5 and the second magnetic guide portion 27 so as to reduce the risk of kickback. Preferably, the beginning of the recess 30, or step 29 is aligned with the center line 6 of the saw 5, although, as disclosed above, the recess can begin anywhere within the diameter of the saw blade 5.

Figure 1:
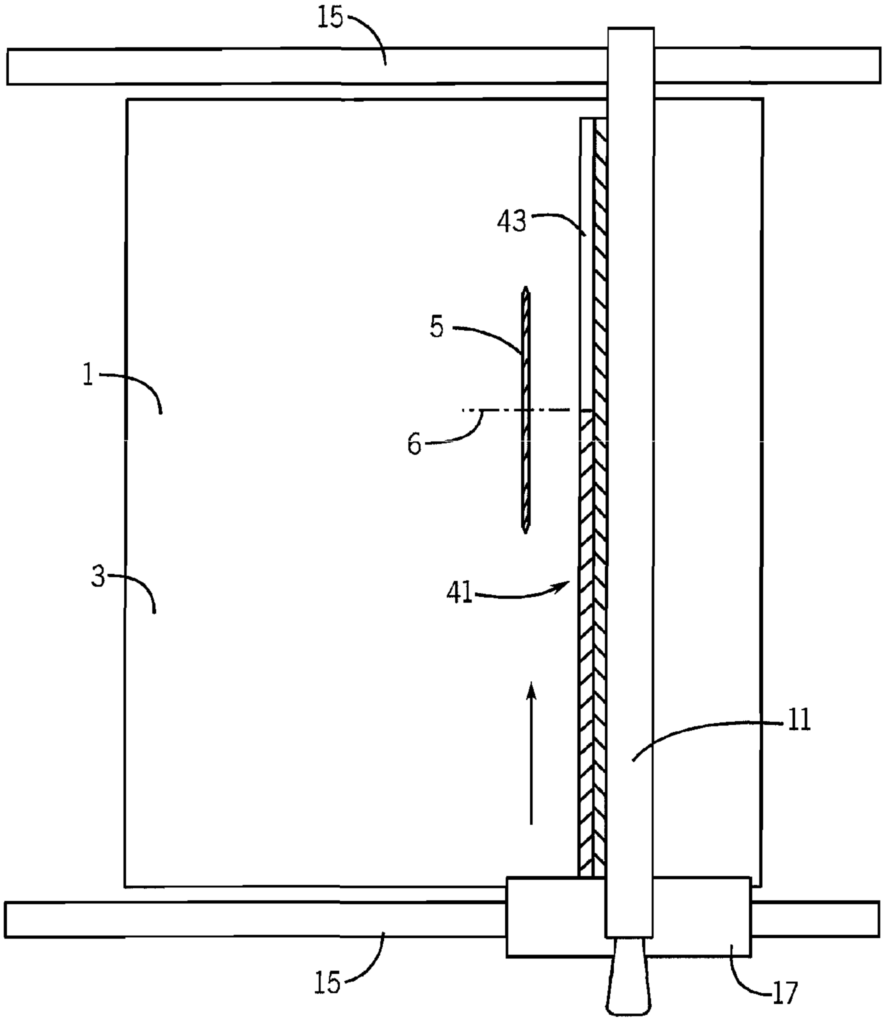
FIG. 1 is a top plan view of a standard table saw having a rip fence that shows a conventional installation of a rip fence and the anti-kickback rip fence guide of the claimed invention.
Figure 2:
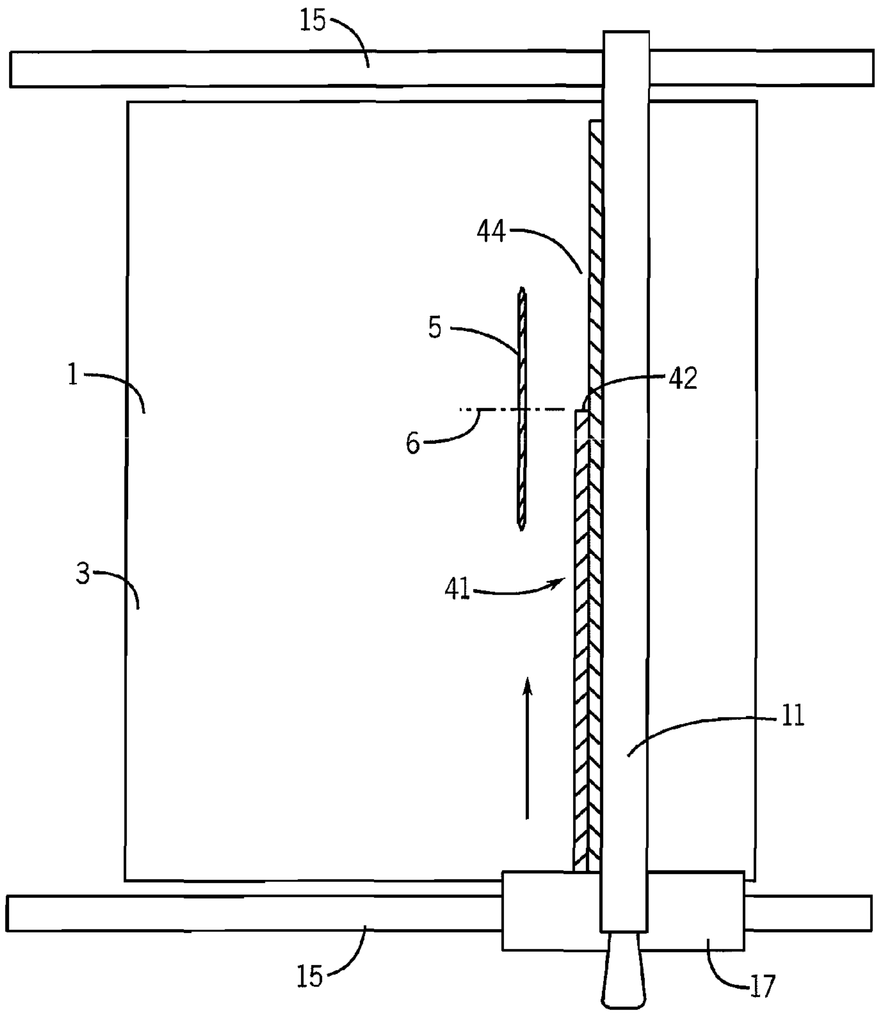
FIG. 2 is a top plan view of a standard table saw having a rip fence that shows an installation of the rip fence guide and wherein the removable rip fence is removed.

FIG. 1 shows an additional embodiment of the claimed invention that also uses anti-kick rip fence guide 41 installed to an existing rip fence 11. FIG. 2 shows the same embodiment wherein the removable rip guide 43 has been removed for rip cutting. As shown in more detail in FIG. 3, the claimed rip fence guide 41 comprises a generally rectangular metal plate 45, a two piece flexible magnet 51, 52 and a two piece plastic cover 53, 54. More specifically, the metal plate 45 comprises a front side 49 and a back side 47. The back side 47 of the metal plate 45 is, in general, adhered to the existing rip fence 11 of a table saw 1, although other means of attachment are certainly possible. For example, the use of two-sided tape, clamps or conventional fasteners all provide relatively quick and easy installation of the metal plate 45 to the rip fence 11.

As shown in FIG. 2, the claimed invention provides a first flexible magnet 51 and a second flexible magnet 52. Combined, the first flexible magnet 51 and the second flexible magnet 52 extend the majority of the length of the rip fence 11. Attached, and preferably adhered to the first flexible magnet 51 is a first flat piece of plastic 53, such as polyethylene. Also attached and preferably adhered to the second flexible magnet 52 is a second piece of plastic 54, also preferably polyethylene.

In combination, the first flexible magnet 51 and the first flat piece of plastic 53 are referred to as the rip guide fence 41 whereas the second flexible magnet 52 and the second piece of plastic 54 are referred to in combination as the removable rip guide 43. As discussed above, for making dado cuts, the removable rip guide 43 is installed to provide a smooth rip fence guide 41. As shown in FIG. 2 for rip cutting, the removable rip guide 43 is removed to create a recess 44 in the rip fence guide 41 so as to create additional space between the saw blade 5 and the rip fence guide portion 41 so as to reduce the risk of kickback.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A table saw comprising:

a table surface comprising an aperture;

a saw blade protruding through the aperture of the table surface, which saw blade can be used to cut or rip a work piece, the saw blade comprising a center line relative to a cutting direction of the saw blade, wherein the center line extends orthogonally relative to the table surface;

a rip fence comprising a longitudinally-extending main body portion, the rip fence extending in a direction along the table surface from a first end to a second end, the rip fence being generally parallel to the saw blade; the rip fence main body portion comprising a recess that extends in a direction along the table surface from a recess first end to a recess second end; and the recess first end is situated substantially at the center line of the saw blade and the recess second end terminates at the second end of the rip fence; and rails along which the rip fence can slide to accommodate work pieces of different widths.

2. The table saw of claim 1 wherein the recess of the main body portion comprises a ferrous metal and the removeable rip guide comprises a magnet.

3. The table saw of claim 2 wherein the recess of the main body portion comprises a magnet and the removeable rip guide comprises a ferrous material.

4. The table saw of claim 1 further comprising an anti-kick rip guide that is removably placed within the recess of the main body portion of the rip fence.

* * * * *